(12) United States Patent
Derouault et al.

(10) Patent No.: US 8,226,331 B2
(45) Date of Patent: Jul. 24, 2012

(54) DEVICE FOR CONVEYING OBJECTS, IN PARTICULAR PREFORMS, BOTTLES OR SIMILAR, BY AIR BLOWING

(75) Inventors: Philippe Derouault, Octeville sur Mer (FR); Alain Charpentier, Octeville sur Mer (FR); Stephane Linglet, Octeville sur Mer (FR)

(73) Assignee: Sidel Participations, Octeville Sur Mer (FR)

( * ) Notice: Subject to any disclaimer, the term of this patent is extended or adjusted under 35 U.S.C. 154(b) by 315 days.

(21) Appl. No.: 12/523,797

(22) PCT Filed: Jan. 15, 2008

(86) PCT No.: PCT/FR2008/050068
§ 371 (c)(1),
(2), (4) Date: Nov. 9, 2009

(87) PCT Pub. No.: WO2008/099118
PCT Pub. Date: Aug. 21, 2008

(65) Prior Publication Data
US 2010/0098503 A1    Apr. 22, 2010

(30) Foreign Application Priority Data
Jan. 22, 2007    (FR) ...................................... 07 00422

(51) Int. Cl.
*B65G 53/00*    (2006.01)
(52) U.S. Cl. .......................... 406/88; 406/182; 193/31 A
(58) Field of Classification Search .................... 406/88, 406/182; 198/442; 193/31 A; 414/676, 414/788
See application file for complete search history.

(56) References Cited

U.S. PATENT DOCUMENTS

| 3,580,640 | A | * | 5/1971 | Eriksson | 406/19 |
| 3,822,006 | A | * | 7/1974 | Shuttleworth | 198/427 |
| 3,890,011 | A | * | 6/1975 | Futer | 406/83 |
| 4,147,248 | A | * | 4/1979 | Kurczak et al. | 198/358 |
| 4,624,369 | A | * | 11/1986 | Okada | 209/626 |
| 4,822,214 | A | * | 4/1989 | Aidlin et al. | 406/86 |
| 4,880,103 | A | * | 11/1989 | Ludwig et al. | 198/434 |
| 5,174,430 | A | * | 12/1992 | Ebira | 198/418.5 |
| 5,388,682 | A | * | 2/1995 | Dudley | 198/367 |
| 5,421,678 | A | * | 6/1995 | Aidlin et al. | 406/88 |
| 5,567,091 | A |   | 10/1996 | Johnson et al. | |
| 5,611,647 | A | * | 3/1997 | Ouellette | 406/88 |
| 5,630,679 | A | * | 5/1997 | Simkowski et al. | 406/86 |
| 5,810,516 | A | * | 9/1998 | Ouellette | 406/86 |

(Continued)

FOREIGN PATENT DOCUMENTS
EP    1 321 394 A2    6/2003
(Continued)

*Primary Examiner* — Joseph A Dillon, Jr.
(74) *Attorney, Agent, or Firm* — Sughrue Mion, PLLC (57) ABSTRACT

Device for conveying objects (1), with supporting and/or guiding means comprising two facing rails (7) situated transversely apart and parallel; at least one of said rails (7) comprises a movable rail section (12) that is adjacent to a fixed portion (13), situated upstream and/or downstream of such rail and means (17) of driving said rail section (12) are capable of moving the latter between two operating positions: a conveying position in which said rail section (12) is aligned with said fixed rail portion (13) and ensures the continuity of the rail (7) and a retracted position in which said rail section (12) is out of alignment with said fixed rail portion (13) in order to interrupt the continuity of the rail (7).

13 Claims, 10 Drawing Sheets

U.S. PATENT DOCUMENTS

| | | | |
|---|---|---|---|
| 6,190,094 B1 * | 2/2001 | Rediess et al. | 406/19 |
| 6,332,740 B1 * | 12/2001 | Bernard et al. | 406/88 |
| 6,494,646 B1 * | 12/2002 | Sala | 406/88 |
| 6,508,352 B1 * | 1/2003 | Enenkel et al. | 198/419.1 |
| 6,736,573 B1 * | 5/2004 | Simkowski | 406/88 |
| 6,854,586 B1 | 2/2005 | VanderMeer et al. | |
| 6,854,936 B2 * | 2/2005 | Dragon et al. | 406/182 |
| 7,481,606 B2 * | 1/2009 | Lyons et al. | 406/98 |
| 7,832,544 B2 * | 11/2010 | Kroessmann | 198/442 |
| 8,033,762 B2 * | 10/2011 | Lopez et al. | 406/182 |
| 2004/0120776 A1 | 6/2004 | Dragon et al. | |

FOREIGN PATENT DOCUMENTS

| | | |
|---|---|---|
| FR | 785 887 A | 8/1935 |
| FR | 2 793 228 A1 | 11/2000 |
| FR | 2 780 713 A1 | 1/2001 |

\* cited by examiner

DEVICE FOR CONVEYING OBJECTS, IN PARTICULAR PREFORMS, BOTTLES OR SIMILAR, BY AIR BLOWING

CROSS REFERENCE TO RELATED APPLICATION

This application is a National Stage of International Application No. PCT/FR2008/050068 filed Jan. 15, 2008, claiming priority based on French Patent Application No. 07 00422, filed Jan. 22, 2007, the contents of all of which are incorporated herein by reference in their entirety.

The present invention relates to improvements made to devices for conveying objects, in particular containers made from a thermoplastic material such as preforms, bottles or similar, by air blowing, such devices including means of supporting and/or guiding said objects that comprise two facing rails that are situated transversely apart from each other and are substantially parallel to each other.

Devices for conveying by air blowing can be applied in plants manufacturing objects, for example for moving the blanks or the finished objects, and/or, in relation to containers, in filling plants for moving the containers upstream of the filling unit. A concrete application relates to manufacturing plants for containers made from a thermoplastic material, for example PET, by blow-moulding or stretch blow-moulding of heated preforms, for example to convey the preforms to the blowing unit and/or to remove the formed containers, and/or to then convey the empty containers to a filling unit. The containers, such as preforms, intermediate containers or blanks, bottles, flasks or similar containers are provided with a neck the base of which is equipped with a collar with a larger diameter than the outer diameter of the neck, and their collar rests on the two rails of the conveying device.

In these plants, it is necessary to remove objects that are unwanted, for example because they have a defect or because they do not correspond to the objects being processed at that time, or if some of the objects are to be collected for inspection or testing purposes, etc. In the aforementioned example of the manufacturing and filling of thermoplastic containers, it is necessary to remove preforms that have defects or are non-compliant (preforms of different types to the type being processed) before they are introduced into the manufacturing unit, then to remove incorrectly formed containers at the output of the manufacturing unit, or even within the manufacturing unit itself, and then to remove damaged containers before they are introduced into the filling machine; containers must also be collected at the output of the manufacturing unit, or even within the unit itself, in order to check that the process is running smoothly.

The removal of unwanted objects and/or the retrieval of objects for inspection purposes take place during the transfer of the objects, and conveying devices must be designed in such a way as to allow for the removal of objects, individually and/or in batches, from a continuous flow of objects that can be moving at high speeds.

Alongside the means of detection capable of detecting objects that must be removed, means of ejection are implemented that may (particularly in the case of containers such as preforms, bottles or similar) comprise a moving part or arm driven, for example pneumatically, transversely to the path of the objects.

These means of ejection, which allow for the removal of objects individually, have been completely satisfactory in the thermoplastic container manufacturing and/or filling plants established to date, which can currently reach a speed in the region of 60,000 containers/hour. However, the operating speed of these means of ejection cannot be increased any further, and as a result they are unsuitable for the plants currently being developed, which are designed for significantly higher speeds that can reach 80,000 containers/hour or even more.

Furthermore, the space available within the container manufacturing plants is increasingly limited and the installation of arm ejection means may be impossible.

The aim of the invention is to meet the various practical demands by proposing a technical solution that is simple and inexpensive to implement and at the same time does not involve significant changes to the conveying device.

To this end, the invention proposes a device for conveying objects by air blowing, including means of supporting and/or guiding said objects, which comprise two facing rails that are situated transversely apart from each other and are substantially parallel to each other, which conveying device, being arranged according to the invention, is characterized in that at least one of said rails comprises a movable rail section that is adjacent to a fixed portion, situated upstream and/or downstream of such rail and in that means of driving said rail section, which are controlled by control means, are capable of moving said rail section between two operating positions, namely:

a first position or conveying position in which said rail section is arranged in line with said fixed rail portion situated upstream and/or downstream in such a way as to ensure the continuity of the rail and a second position or retracted position in which said rail section is moved out of line with said fixed rail portion situated upstream and/or downstream in such a way as to interrupt the continuity of the rail.

By means of this arrangement, it is possible to create a gap in the conveyance path of the objects, allowing for the removal of an individual object or a group of objects from the flow of moving objects. This gap created in the conveyance path can be made very quickly, with a very short duration, by a small movement of a guide rail section. The arrangement proposed according to the invention is therefore particularly appropriate to object processing plants operating at high speeds that are currently required by users, particularly in the field of the manufacturing and filling of containers such as bottles, flasks, flagons, etc. made from a thermoplastic material such as PET.

Various embodiments can be envisaged in order to implement the technical solution proposed by the invention.

A possible first embodiment could consist in that said movable rail portion be movable substantially parallel to itself, particularly upwards, in such a way that the object(s) removed could fall freely by gravity.

However, the practical embodiment of the solution that has just been mentioned requires components for guiding the rail section during its movement, whilst the driving means must be suitable for controlling the inertia of the entire rail section during its movement which, it must be remembered, must be extremely fast over a relatively short reciprocate stroke, which implies that the whole of the mobile assembly of which the movable rail section is part is subject to great acceleration.

As a result, another possible embodiment that is preferred in practice consists in that the rail section pivots downwards about its upstream end; in particular, provision can be made for the rail section to be integral with the adjacent fixed rail section situated upstream of said upstream end, for said upstream end to be securely anchored by anchoring means and for the rail section to be bendable from such securely anchored end.

In standard fashion, it seems advantageous that the two rails respectively have two rail sections that can be moved jointly, in such a way that the object(s) to be removed are diverted whilst still resting on the two rails and therefore without being unbalanced, which allows for the risk of the objects becoming wedged to be avoided.

The driving means of the movable rail section(s) can be of any type appropriate on the one hand to the result to be achieved and on the other hand to the environment in which the conveying plant is located. In practice, given the speed of movement required, it seems advantageous that the driving means be of a pneumatic or electropneumatic type or an electromagnetic type.

Also in a practical manner, the control means can advantageously comprise a sensor capable of detecting an unwanted object which must be ejected from the conveying device, arranged upstream of the movable rail section(s).

A preferred application of the device arranged according to the invention relates to a situation in which the objects to be moved are containers, such as preforms, bottles, flasks or similar, made from a thermoplastic material, in particular PET, having a neck equipped with an annular collar projecting radially and capable of resting on the two rails.

A better understanding of the invention will be gained on reading the following detailed description of certain embodiments given as purely illustrative examples only. In the description, reference is made to the attached drawings, in which.

Figure 1A:
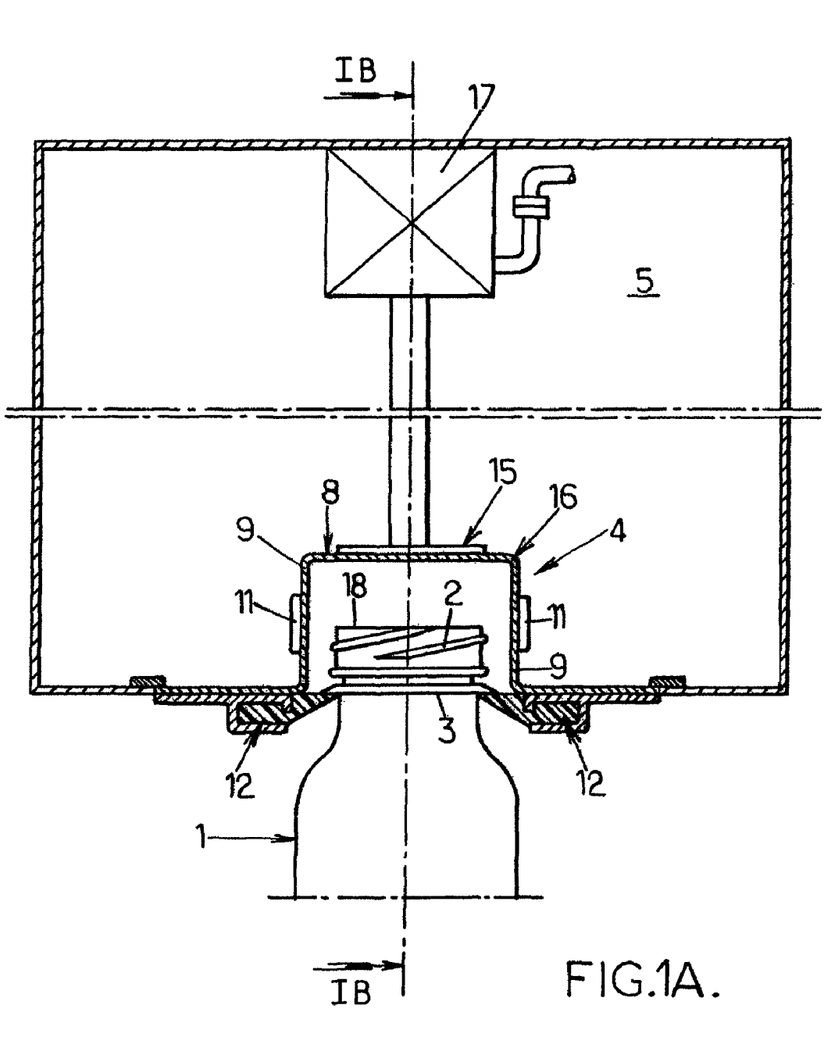
FIGS. 1A and 1B are two diagrammatic views, in transverse cross-section along the line IA-IA in FIG. 1B and in longitudinal cross-section along the line IB-IB in FIG. 1A respectively, showing, in a first operating position (conveying position), a first embodiment of a section of a device for conveying by air blowing, necked containers illustrated in the form of bottles.
Figure 1B:
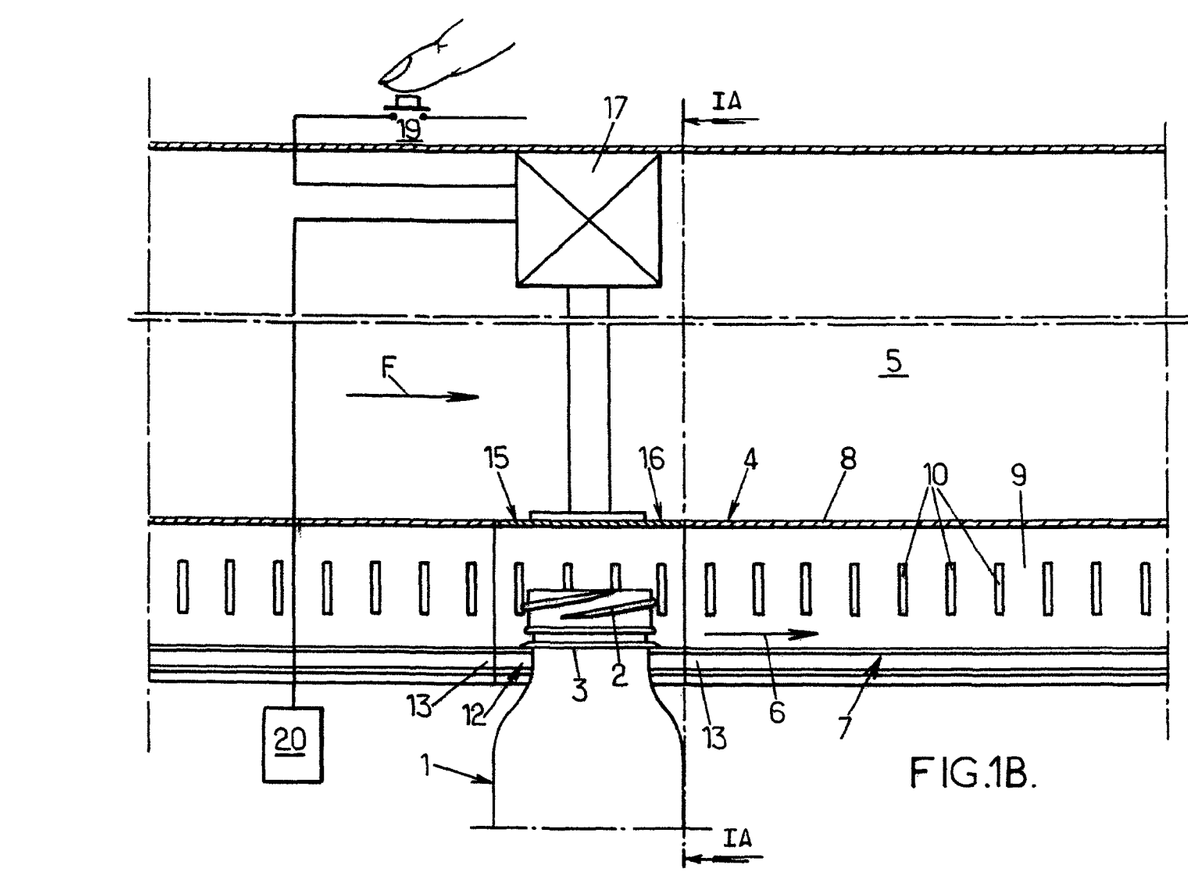

With reference firstly to FIGS. 1A and 1B, a device for conveying objects by pulsed air blowing is illustrated more particularly in a configuration appropriate to the movement of necked 2 containers 1, and more specifically containers made from a thermoplastic material such as PET, in particular preforms, bottles, flasks, flagons, etc., on which the neck 2 is provided, at or near its base, with a protruding annular collar 3; this application, although not exclusive, is more particularly the object of the invention.

The conveying device comprises, essentially, means 4 of propelling air onto the objects to be moved, and more specifically in the example in question onto the necks 2 of the containers 1, in such a way that they are moved along a path (in FIG. 1B, the direction of movement of the containers is shown by an arrow 6). The conveying device comprises a source of pulsed air (not shown) and a chamber 5 to distribute the pulsed air along the means of propulsion 4 (the direction of flow of the pulsed air in the chamber 5 is shown by an arrow F in FIG. 1B, that is, in the direction of movement of the containers 1). The distribution chamber 5 and the means of propulsion 4 extend along the entire path of the containers 1 to be conveyed.

The path of the containers is defined by support and/or guidance means comprising two rails 7 arranged facing each other, substantially parallel to each other and spaced apart from each other transversely to the path of the containers, by a distance greater than the diameter of the neck 2 of the containers and smaller than the diameter of the collar 3 of the containers, in such a way that the containers 1 rest on the rails 7 by their collar 3. Preferably, at least the part of the rails 7 on which the collars 3 rest is constituted of a material with a low friction coefficient.

The propulsion means 4 comprise a duct 8, open at the bottom, which covers the rails 7, the assembly made up of the duct 8 and the two rails 7 forming a trough open at the bottom in which the necks 2 of the containers 1 are engaged. The duct 8 can advantageously have a generally substantially rectangular-shaped cross section and its side walls 9 are equipped with a multiplicity of apertures 10 covered on the outside by a visor 11 open in the upstream direction (in the direction F of flow of the pulsed air).

Further details on these devices for conveying by air blowing can be found for example in documents FR 2,780,713, FR 785,887 and FR 2,793,228.

According to the invention, it is proposed that these devices for conveying by air blowing be arranged in such a way that they can eject certain containers individually and/or in groups, in particular to either remove unwanted containers or to collect containers for inspection purposes.

To this end, provision is made, according to the invention, for at least one of said rails 7 to comprise a movable rail section 12 that is adjacent to a fixed portion 13, situated upstream and/or downstream of said rail 7, and for means 17 of driving said rail section 12, which are controlled by control means, to be capable of moving said rail section 12 between two operating positions, namely:

a first position or conveying position (FIGS. 1A and 1B) in which said rail section 12 is arranged in line with said fixed rail portion 13 situated upstream and/or downstream in such a way as to ensure the continuity of the rail 7 and a second position or retracted position (FIGS. 2A and 2B) in which said rail section 12 is moved out of alignment with said fixed rail portion 13 situated upstream and/or downstream in such a way as to interrupt the continuity 14 of the rail 7.

In standard fashion, the container reaching the gap 14 falls into a collecting tub below, either to be used later for monitoring production, or because it is unwanted (out-of-tolerance container, defective container, etc.) and sent for scrap. However, other possible uses can be envisaged, an example of which will be given below.

Various technical solutions can be envisaged for the practical implementation of the general provisions set out above.

A first solution can consist of the rail section 12 being movable substantially parallel to itself. As there is a risk that the downwards movement of the rail section 12 might hinder or even prevent the fall of the container to be removed, it is advantageous that the rail section 12 be upwardly movable substantially parallel to itself. However, due to the presence of the duct 8, it is an assembly 15 constituted by a section 16 of the duct and two corresponding facing rail sections 12 that must be moved upwards.

An embodiment of such an arrangement is shown in FIGS. 1A, 1B, and 2A, 2B.

In the conveying position shown in FIGS. 1A and 1B, the assembly 15 is held in the lowered position by the driving means 17 in such a way that the duct section 16 is situated in line with the duct 8 and the two rail sections 12 are situated in line with the two fixed rail portions 13 respectively.

Figure 2A:
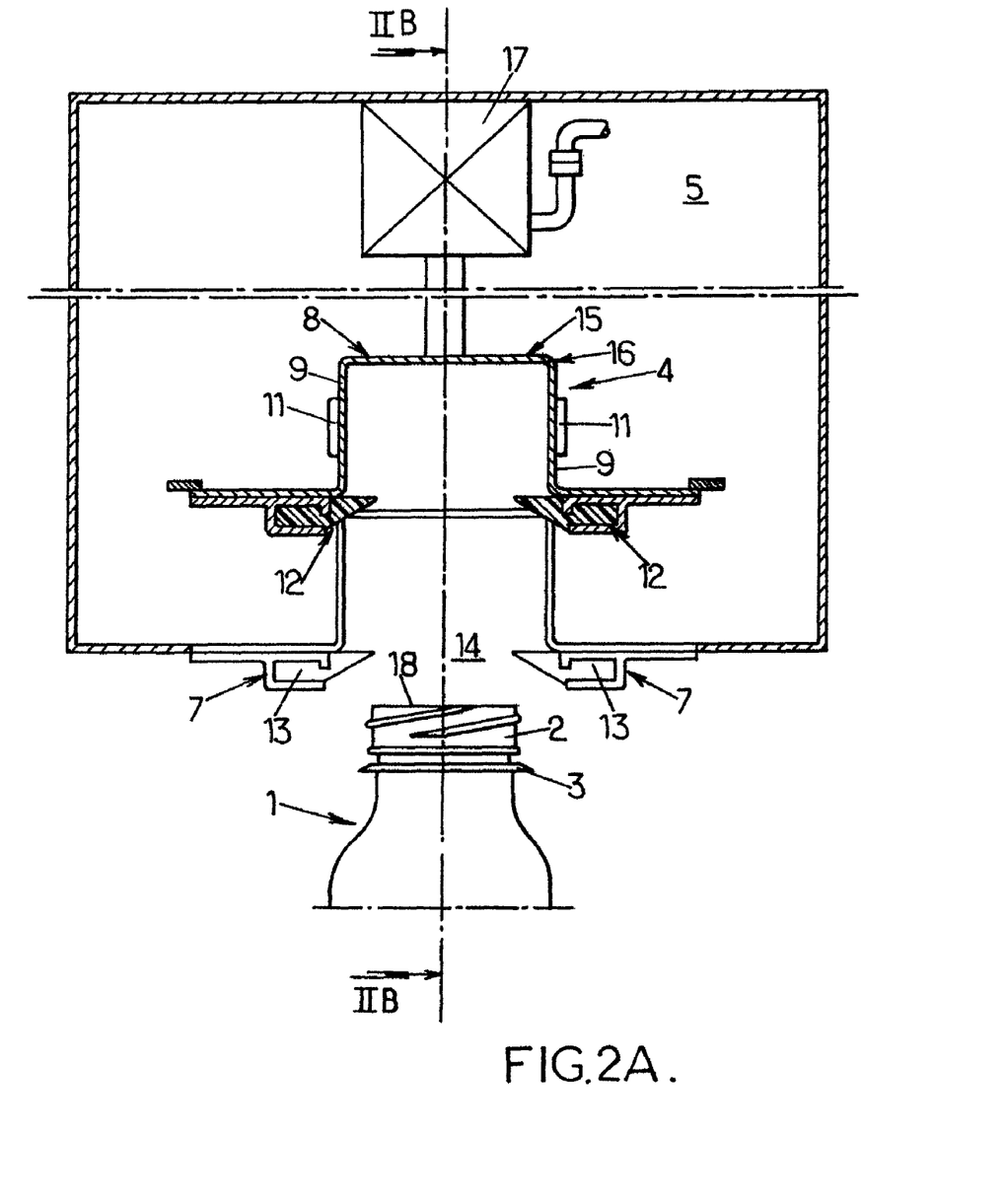
FIGS. 2A and 2B are two diagrammatic views, in transverse cross-section along the line IIA-IIA in FIG. 2B and in longitudinal cross-section along the line IIB-IIB in FIG. 2A respectively, showing, in a second operating position (retracted position or removal position), the section of the conveying device by air blowing in FIGS. 1A and 1B.
Figure 2B:
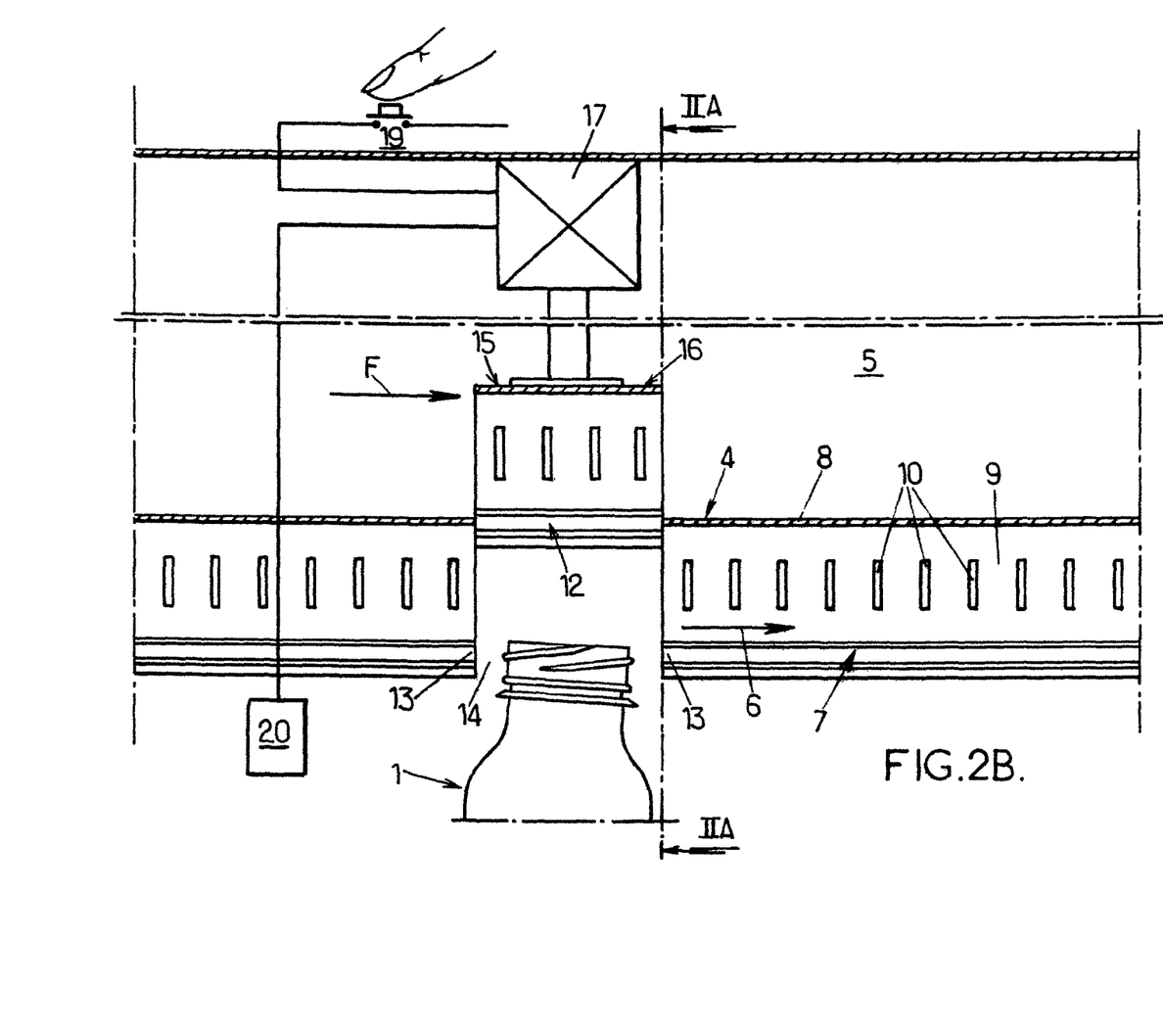

In the ejection position shown in FIGS. 2A and 2B, the assembly 15 is raised by the driving means 17 in such a way that the two rail sections 12 are situated above the path followed by the rims 18 (upper edges) of the necks 2 of the containers 1. The raising of the assembly creates a gap 14 through which the arriving container(s) 1 fall out of the conveying device.

The driving means 17 are controlled by control means that can be (FIGS. 1B and 2B) manual control means 19 for the manual control of the ejection of containers 1 (for example to collect containers for inspection purposes) and/or automatic control means 20 including sensors capable of detecting unwanted containers in order to eject them.

The driving means 17 can be of any type appropriate to the function to be performed and to the environment of the conveying device. In practical terms, in the example more particularly envisaged, the driving means 17 can be pneumatic or electropneumatic as shown diagrammatically on the drawings, or electromagnetic.

Figure 3A:
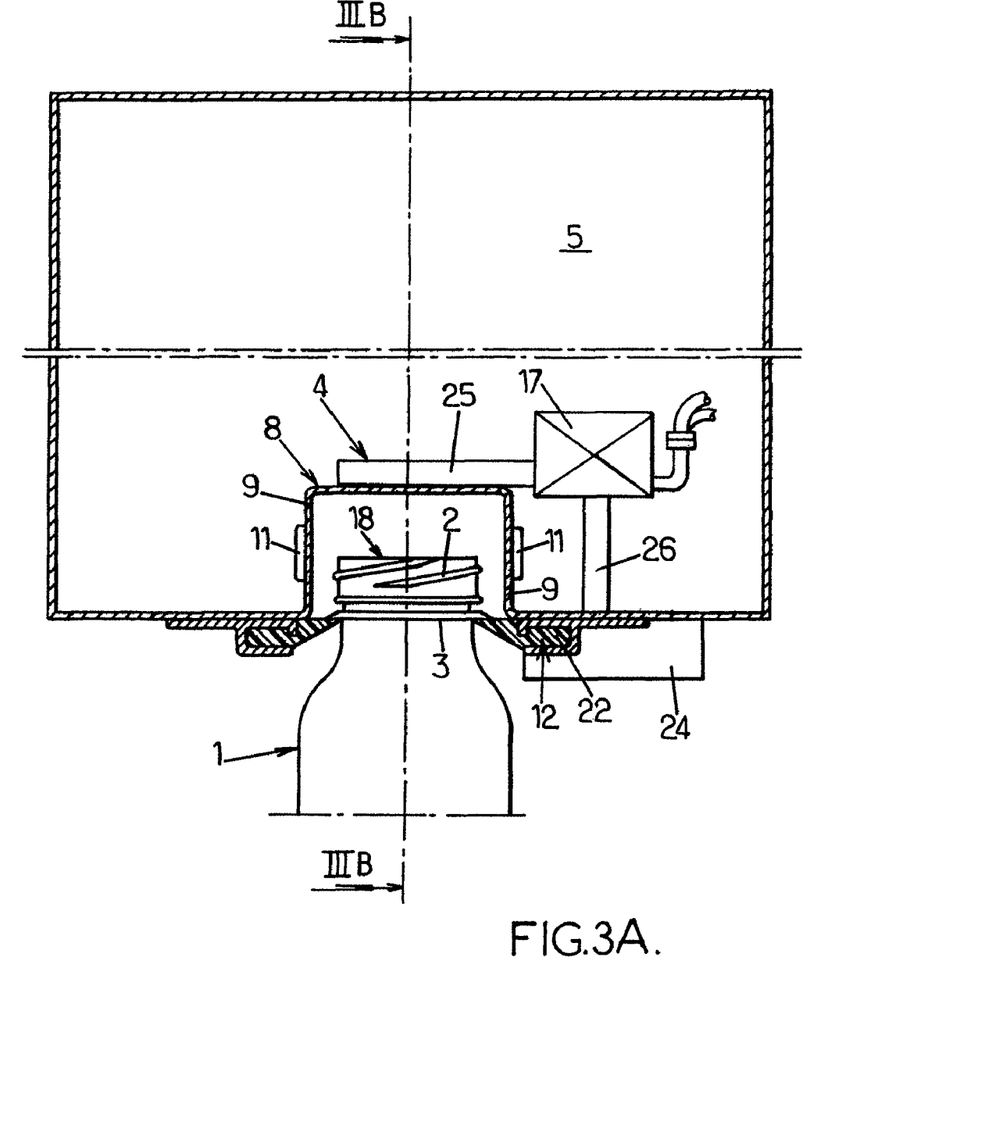
FIGS. 3A and 3B are two diagrammatic views, in transverse cross-section along the line IIIA-IIIA in FIG. 3B and in longitudinal cross-section along the line IIIB-IIIB in FIG. 3A respectively, showing, in a first operating position (conveying position), a second embodiment of a section of a device for conveying by air blowing, necked containers illustrated in the form of bottles.
Figure 3B:
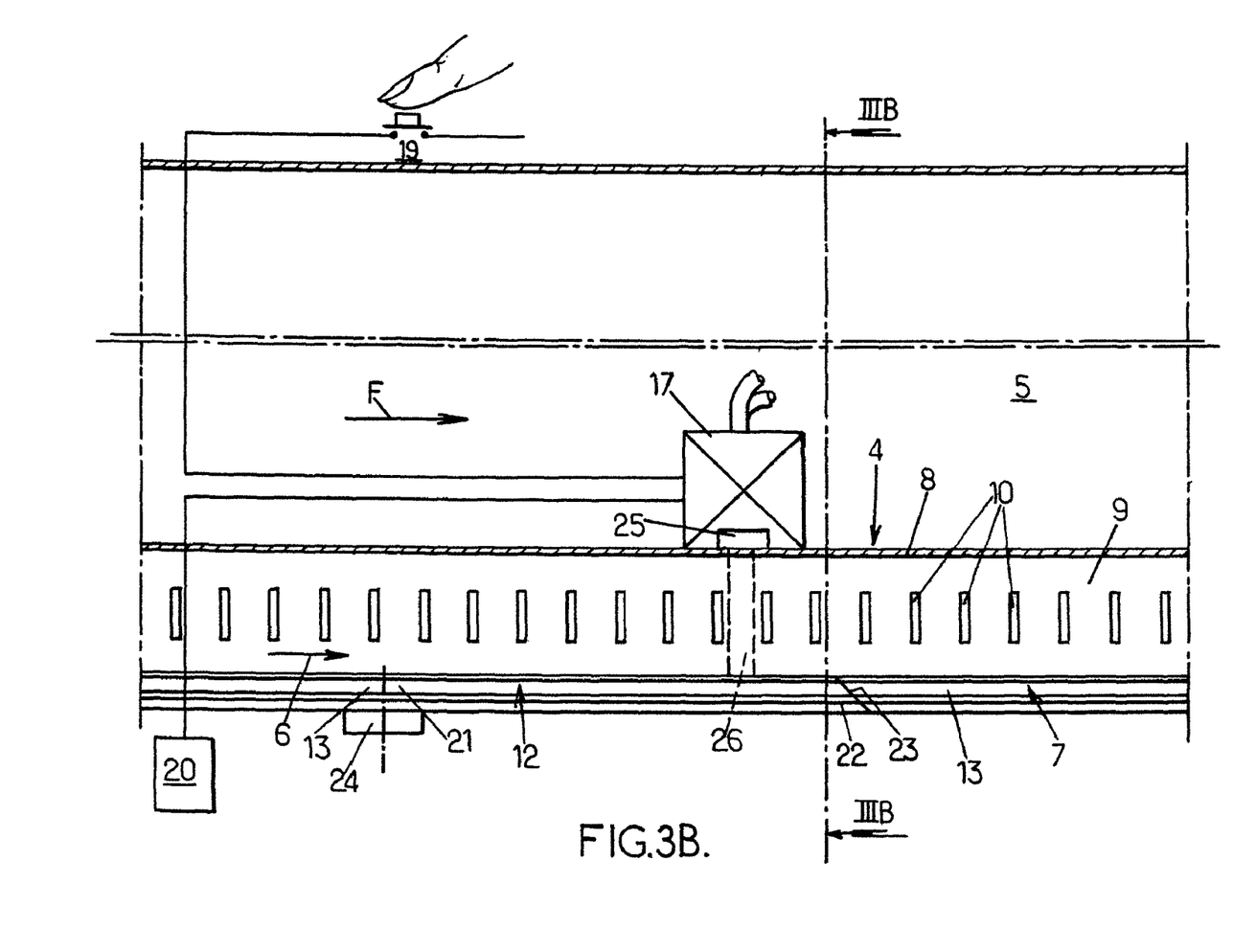
Figure 4A:
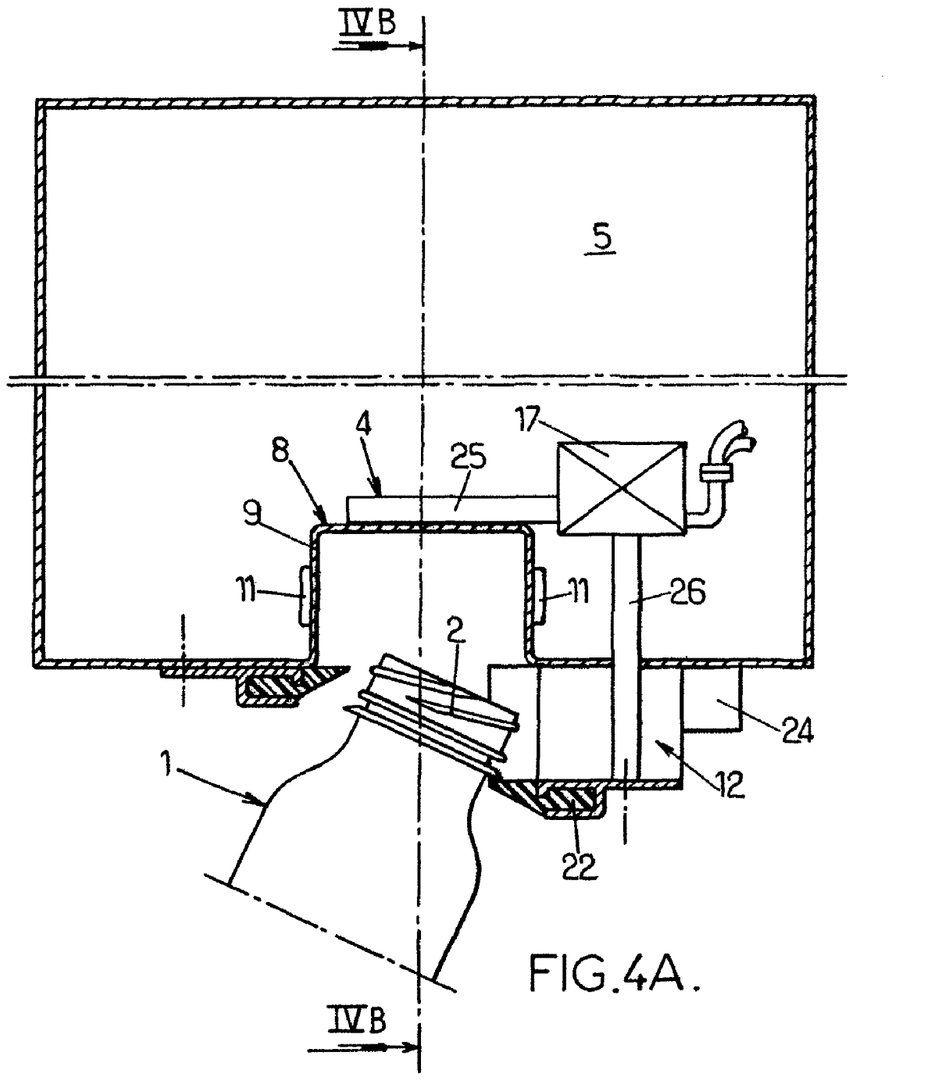
FIGS. 4A and 4B are two diagrammatic views, in transverse cross-section along the line IVA-IVA in FIG. 4B and in longitudinal cross-section along the line IVB-IVB in FIG. 4A respectively, showing, in a second operating position (retracted position or removal position), the section of the conveying device by air blowing in FIGS. 3A and 3B.

FIGS. 3A, 3B and 4A, 4B show another embodiment of the provisions according to the invention that implement the vertical rotation of a section of one of the rails 7 (the rail on the right-hand side in FIGS. 3A and 4A).

Figure 4B:
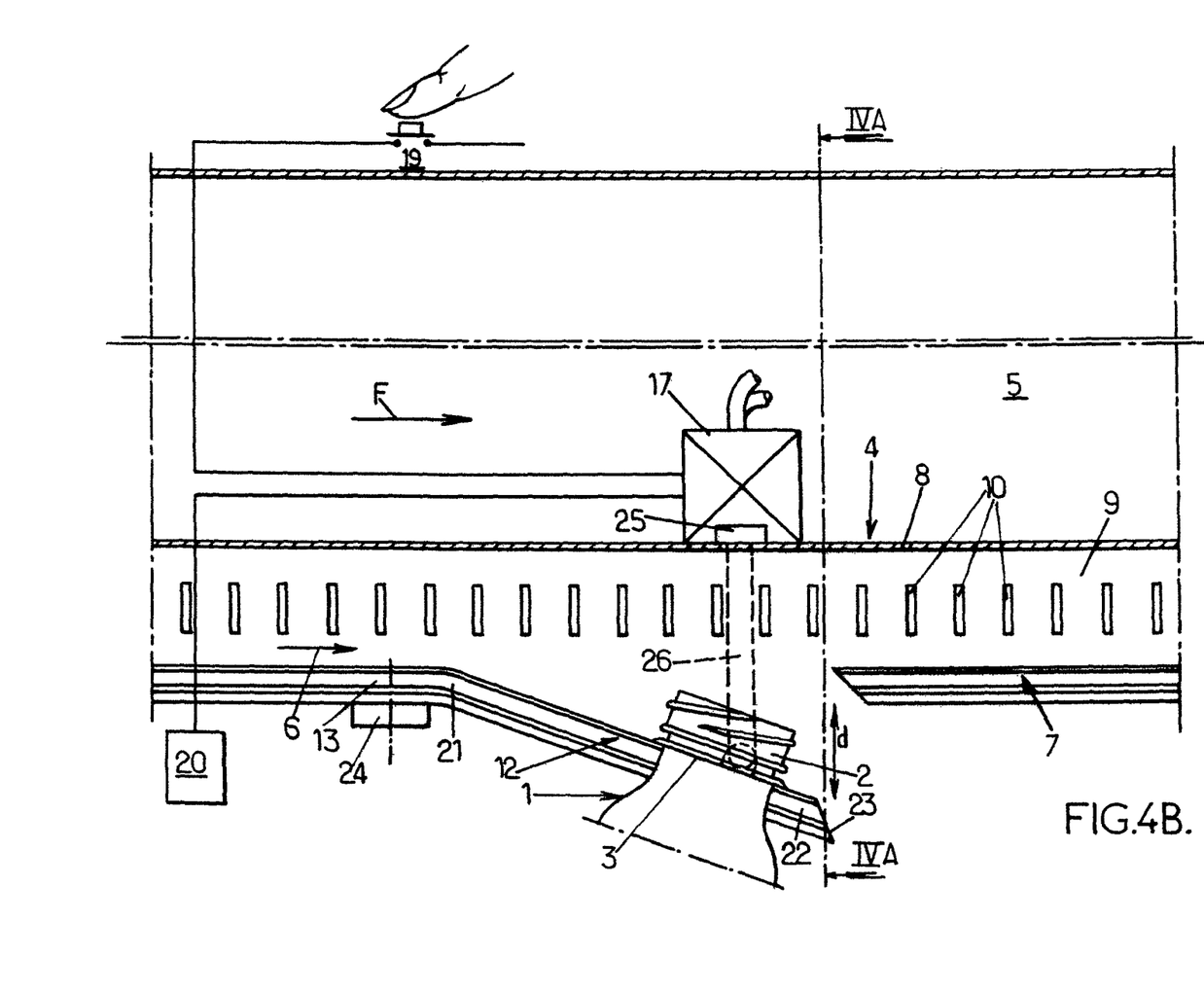

To this end, as can be seen more clearly in FIGS. 3B and 4B, the rail section 12 is defined between a rotating end 21 situated upstream (in the direction of travel of the pulsed air) and a free end 22 situated downstream, preferably with a sloping tip 23 capable of facilitating the joint with the adjacent fixed rail portion 13. The end 21 could of course be secured to the fixed rail portion 13 adjacent to it by means of a rotating hinge. However, to simplify the structure and avoid rubbing parts, which are subject to wear, it is advantageous for the rail section 12 to be integral with the fixed portion 13 situated upstream that is adjacent to it and for the desired rotation to be obtained by means of the flexibility of the rail. The point at which the rail bends is fixed by an anchoring part 24.

The driving means 17 can be supported by the duct 8 by means of a bracket 25 or similar and are secured to the rail section 12 by means of a rod 26.

In the same manner as in the previous embodiment, the driving means 17 are assumed to be of a pneumatic type and are controlled by manual control means 19 for the manual control of the ejection of containers 1 (for example to collect containers for inspection purposes) and/or automatic control means 20 including sensors capable of detecting unwanted containers in order to eject them.

In the raised position of the rail section 12, shown in FIGS. 3A and 3B, the rail section 12 is arranged in line with the fixed rail portions 13 that are adjacent to it upstream and downstream, and the containers 1 are conveyed by the pulsed air as normal.

When the actuation means 17 are controlled under the action of one of the possible control means 19, 20, the rail section 12 is lowered by rotation about its upstream end 21 (in the example shown) with an angular amplitude such that the distance d between the free end 22 of the rail section 12 of the end facing the adjacent fixed rail portion 13 is at least equal to, and preferably greater than, the height of the neck of the container 1. When it arrives on the rail section 12 inclined in this way, the container 1 is unbalanced on one side and comes free of the opposite fixed rail as shown in FIG. 4A, then it falls.

It must however be pointed out that the asymmetrical unbalancing that the container undergoes leads to a transverse rocking of the container, becoming superimposed on its axial movement. This complex, rather disorderly movement can be a hindrance, particularly on devices operating at very high speeds, and even lead to the wedging of the container.

Figure 5:
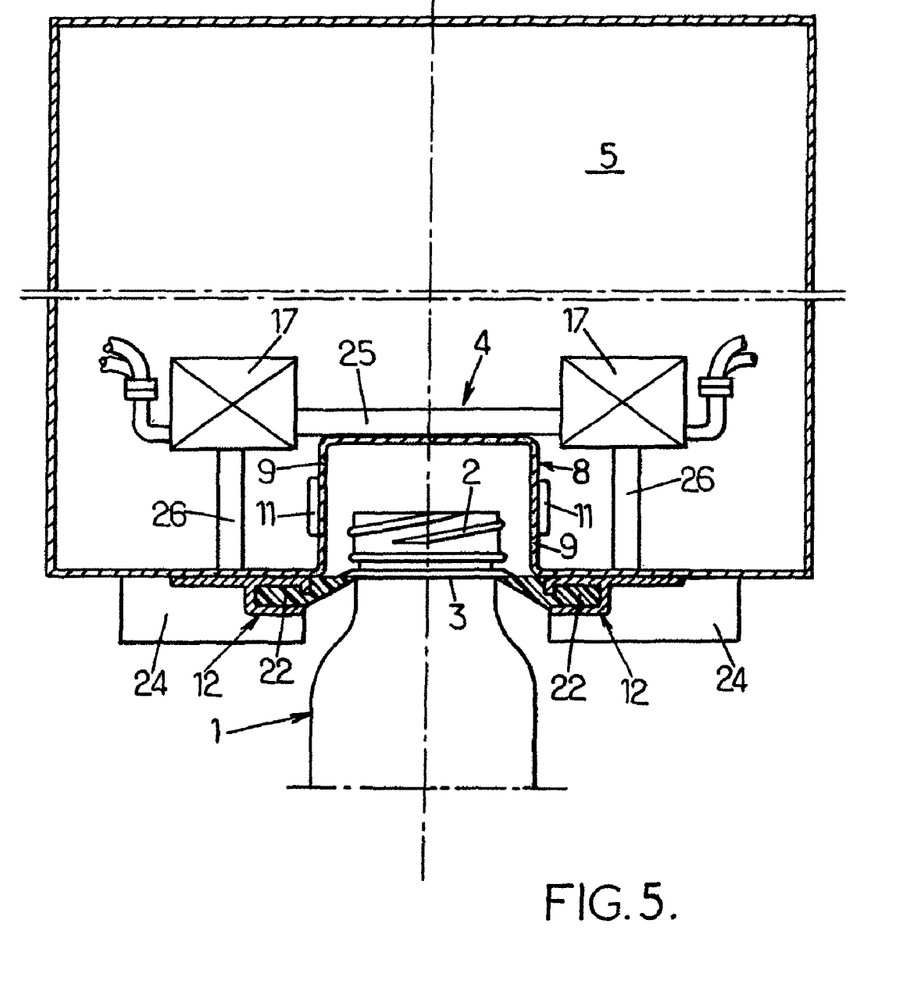
FIG. 5 is a transverse cross-sectional diagrammatic view similar to that in FIG. 3A, showing, in a first operating position (conveying position), a preferred third embodiment of a section of a device for conveying by air blowing, necked containers illustrated in the form of bottles.
Figure 6:
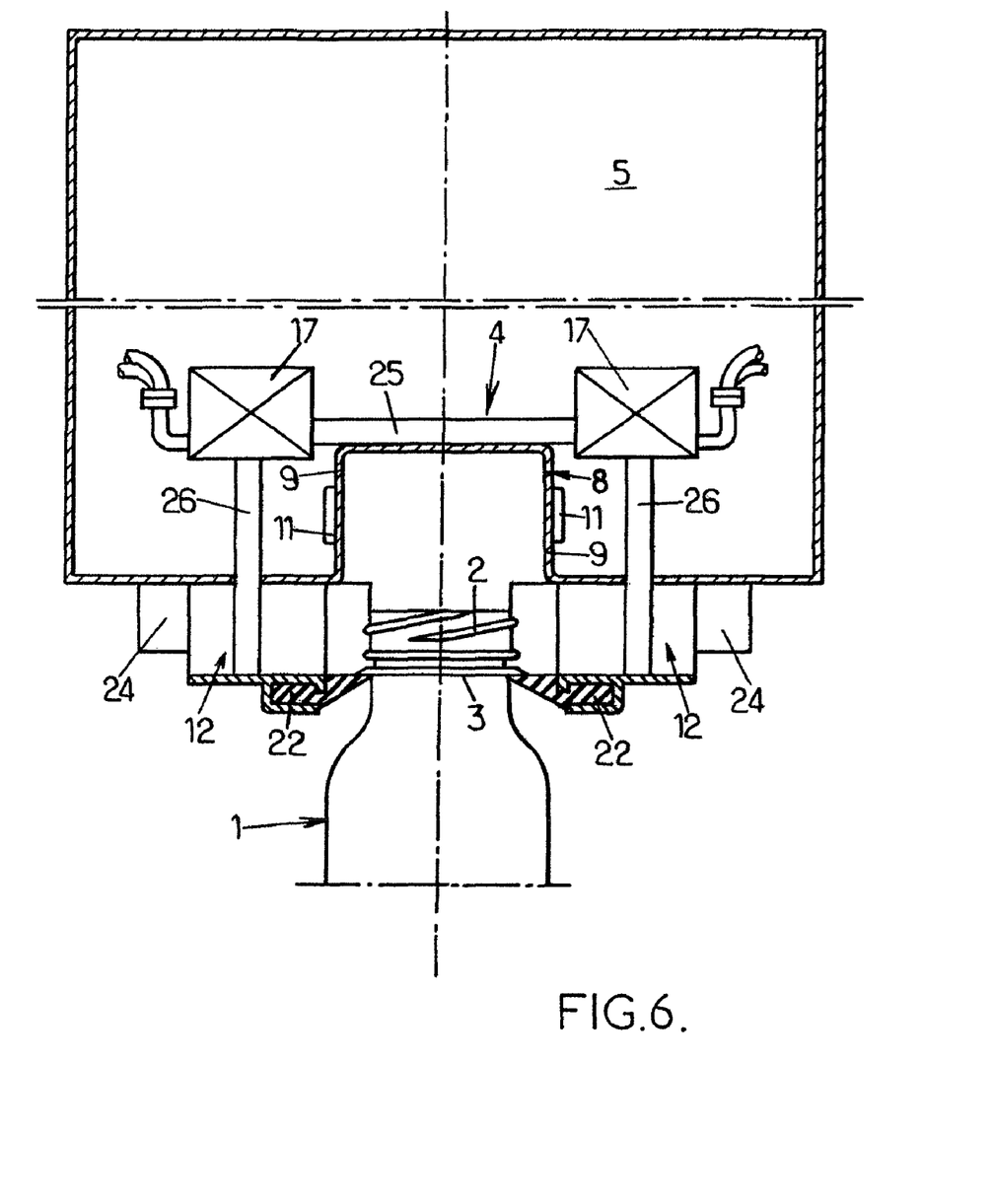
FIG. 6 is a transverse cross-sectional diagrammatic view similar to that in FIG. 4A, showing, in a second operating position (retracted position or removal position), the section of the conveying device by air blowing in FIG. 5.

In order to avoid this drawback, the embodiment shown in FIGS. 5 and 6, which is extrapolated from the previous embodiment set out above, might be preferred. In this preferred embodiment, it is the two rails 7 of the support and/or guidance means that are equipped with two respective rail sections 12, situated facing each other, associated with driving means that are either shared or separate and synchronized as shown in FIGS. 5 and 6. In the example shown in FIGS. 5 and 6, the single arrangement of the previous embodiment shown in FIGS. 3A, 3B, and 4A, 4B is produced twice.

FIG. 5 shows the preferred embodiment in the raised position or conveying position (the side view is similar to the view in FIG. 3B).

FIG. 6 shows the preferred embodiment in the lowered position or ejection position (the side view is similar to the view in FIG. 4B), with the two rail sections 12 inclined downwards. The container 1 is therefore diverted downwards, away from the normal conveyance path, whilst still resting bilaterally on the two rail sections 12 by its collar 3. The container 1 is ejected whilst retaining a stable vertical position, without undergoing the disorderly movement encountered in the previous embodiment.

The above detailed description sets out a variety of embodiments of the device according to the invention in the context of application to the ejection of containers from a path, in particular for the purpose of collecting containers for inspection or removal of unwanted containers. It can however also be envisaged that the device according to the invention, in its preferred embodiment set out in relation to FIGS. 5 and 6, be used as a vertical switch between two stacked conveyors capable of directing the containers 1 to one or other of these conveyors.

The invention claimed is:

1. A device for conveying objects by air blowing, comprising means of supporting and/or guiding said objects, which means comprises two facing rails that are situated transversely apart from each other and are substantially parallel to each other forming a conveyance path of the objects, wherein
    at least one of said rails comprises a movable rail section that is adjacent to a fixed rail portion, situated upstream or downstream of said at least one rail, and driving means for driving said rail section are controlled by control means and are capable of moving said movable rail section between two operating positions, namely:

a first position or conveying position in which said rail movable section is arranged in line with said fixed rail portion situated upstream or downstream in such a way as to ensure the continuity of said at least one rail and a second position or retracted position in which said movable rail section is moved out of alignment with said fixed rail portion situated upstream and/or downstream in such a way as to interrupt the continuity of said at least one rail, in order to create a gap in the conveyance path of the objects, allowing for removal of an individual object or a group of objects from a flow of moving objects.

2. A device for conveying objects by air blowing, comprising means of supporting and/or guiding said objects, which means comprises two facing rails that are situated transversely apart from each other and are substantially parallel to each other forming a conveyance path of the objects, wherein at least one of said rails comprises a movable rail section that is adjacent to a fixed rail portion, situated upstream and downstream of said at least one rail, and driving means for driving said rail section, which are controlled by control means and are capable of moving said rail section between two operating positions, namely:

a first position or conveying position in which said rail section is arranged in line with said fixed rail portion situated upstream and downstream in such a way as to ensure the continuity of said at least one rail and a second position or retracted position in which said rail section is moved out of alignment with said fixed rail portion situated upstream and/or downstream in such a way as to interrupt the continuity of said at least one rail, in order to create a gap in the conveyance path of the objects, allowing for removal of an individual object or a group of objects from a flow of moving objects.

3. A device for conveying objects by air blowing, comprising a support, the support comprising two facing rails that are situated transversely apart from each other and are substantially parallel to each other forming a conveyance path of the objects, wherein at least one of said rails comprises a movable rail section that is adjacent to a fixed rail portion and the movable rail section being controlled to move between a conveying position and a retracted position;

the conveying position having the movable rail section arranged in line with the fixed rail portion to ensure a continuity of said at least one rail and the retracted position having the movable rail section being moved out of alignment with the fixed rail portion to interrupt the continuity of said at least one rail, in order to create a gap in the conveyance path of the objects, allowing for removal of an individual object or a group of objects from a flow of moving objects.

4. The conveying device according to claim 1 or 2, wherein said movable rail section is movable substantially parallel to the fixed rail portion.

5. The conveying device according to claim 4, wherein said movable rail section is movable upwards substantially parallel to the fixed rail portion.

6. The conveying device according to claim 1 or 2, wherein said movable rail section pivots downwards about an upstream end of said rail section.

7. The conveying device according to claim 6, wherein said movable rail section rotates downwards about an upstream end of said rail section.

8. The conveying device according to claim 7, wherein said rail section is integral with an adjacent fixed rail portion situated upstream, said upstream end is securely anchored by anchoring means and said rail section is bendable from said securely anchored upstream end.

9. The conveying device according to claim 1 or 2, wherein said two rails respectively have two rail sections that can be moved jointly.

10. The conveying device according to claim 1 or 2, wherein said driving means are of an electropneumatic type.

11. The conveying device according to claim 1 or 2, wherein said driving means are of an electromagnetic type.

12. The conveying device according to claim 1 or 2, wherein said control means comprises at least one sensor capable of detecting an unwanted object that must be ejected from the conveying device.

13. The conveying device according to claim 1 or 2, wherein the objects to be moved are containers made from a thermoplastic material, having a neck equipped with an annular collar projecting radially and capable of resting on said two rails (7).

* * * * *